June 7, 1927.
G. J. RACKHAM
1,631,338
CHANGE SPEED TRANSMISSION
Filed Sept. 24, 1923
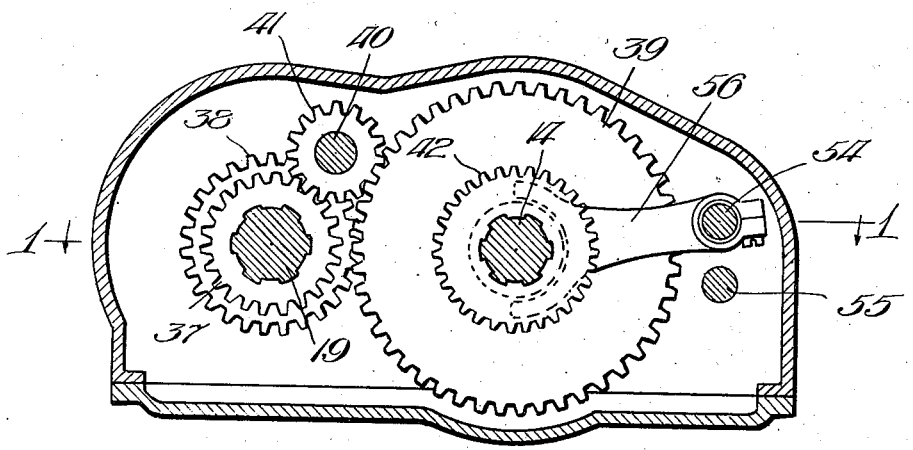
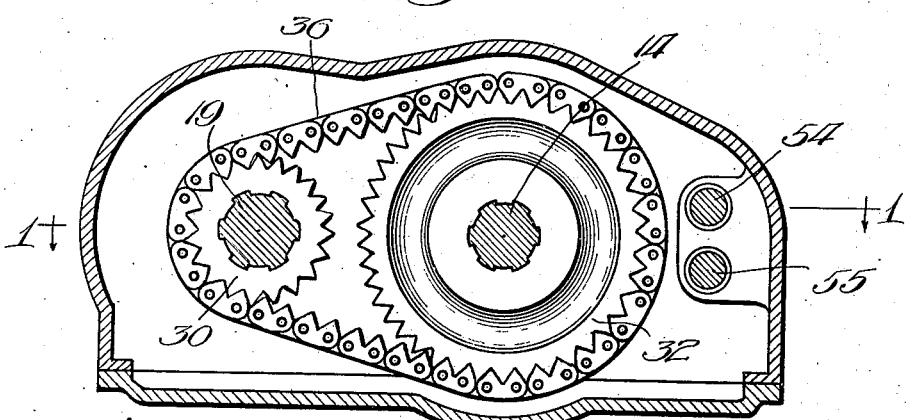
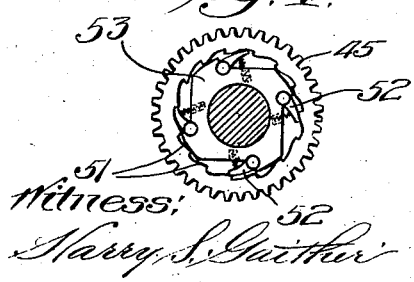
Inventor:
George J. Rackham Patented June 7, 1927.

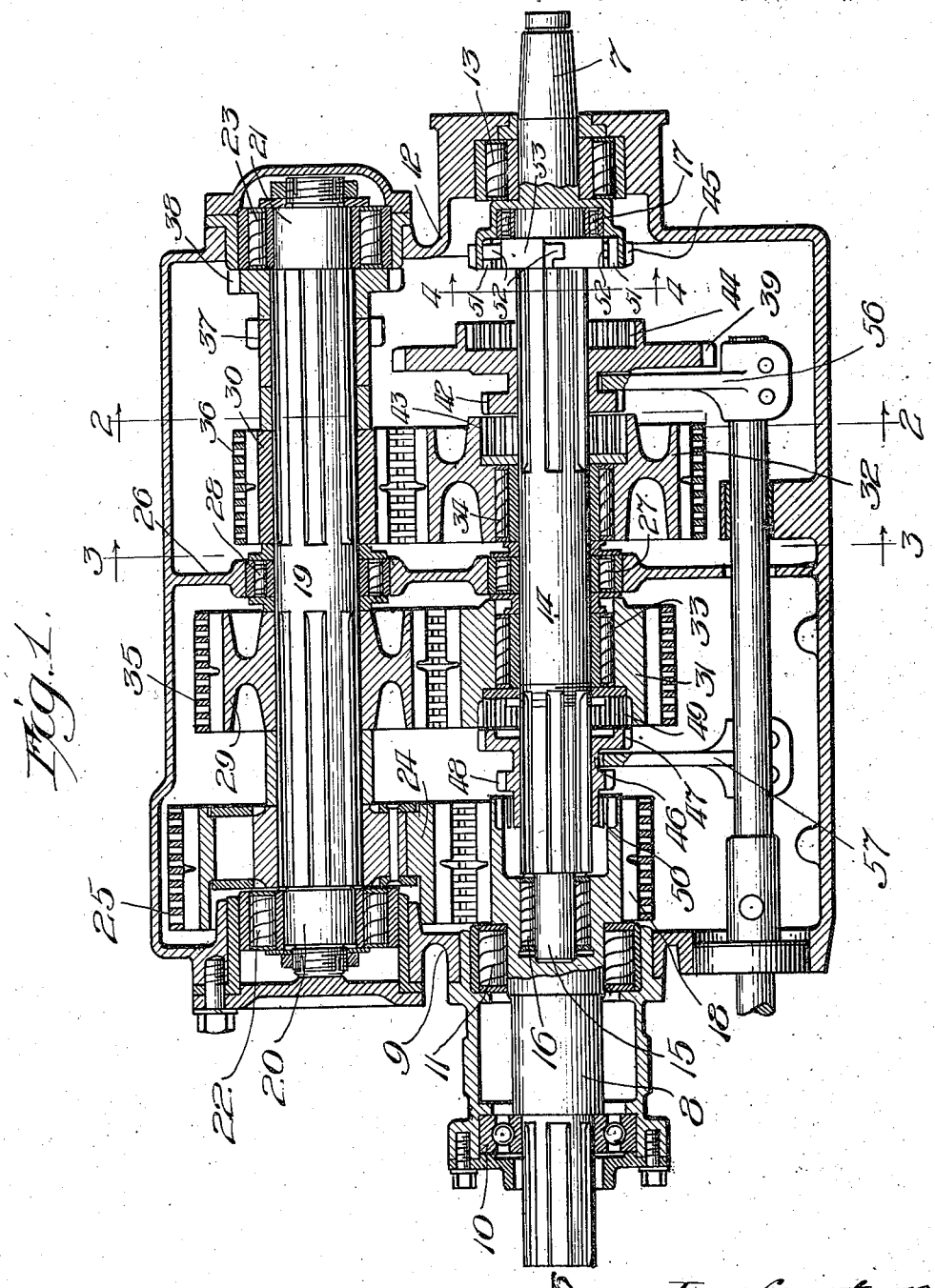

1,631,338

UNITED STATES PATENT OFFICE.

GEORGE J. RACKHAM, OF CHICAGO, ILLINOIS, ASSIGNOR TO YELLOW COACH MANUFACTURING CO., OF CHICAGO, ILLINOIS, A CORPORATION OF ILLINOIS.

CHANGE-SPEED TRANSMISSION.

Application filed September 24, 1923. Serial No. 664,523.

This invention has to do with certain improvements in change speed transmissions for automobiles, motor vehicles, and like uses.

One of the objects of the present invention is to provide a change speed transmission having provision for a plurality of speeds forward, together with a reversing position, one of the forward speed positions, preferably the first or lowest speed, being established by the use of gears, and the other forward speeds being established by the use of chains and sprockets. The use of chains and sprockets for certain of the speed reductions will present the advantage that a very quiet and smooth running change speed arrangement is provided, since use may be made of so called silent chains or similar constructions.

In connection with the use of a gear drive for the first forward speed, together with chain drives for the other forward speeds and gear drives for reverse, I would also point out that it becomes possible to eliminate the use of an intermediate or jack shaft during the reverse gear drive, since a direct meshing of the gear and pinion on the transmission shaft and lay shaft respectively will give a reverse drive as compared to the use of a chain connection between these shafts.

In connection with all of the foregoing, a further object is to provide a very simple and compact construction, by the use of which it becomes possible to secure four speeds forward and one speed reverse, one of the forward speeds and the reverse drive being attained by the use of gears, and two of the higher forward speeds being attained by the use of chain drives, the other forward speed being direct drive.

A further feature in this connection is to provide an arrangement whereby the various parts are subjected to very simple and regular movements in passing through the different speed combinations.

Further objects and uses of the invention will appear from a detailed description of the same, which consists in the features of construction and combinations of parts hereinafter described and claimed.

In the drawings:

Figure 1 shows a plan or horizontal central section through a transmission embodying the features of the present invention. It may also be considered as a section taken on lines 1—1 of Figs. 2 and 3 looking in the direction of the arrows;

Fig. 2 shows a cross section taken on line 2—2 of Fig. 1 looking in the direction of the arrows;

Fig. 3 shows a cross section taken on line 3—3 of Fig. 1 looking in the direction of the arrows; and Fig. 4 shows a fragmentary section on line 4—4 of Fig. 1 looking in the direction of the arrows.

In the construction shown in the drawings, the engine is intended to drive the connection 6, and the universal joint or other power receiving device is intended to be driven by the connection 7 in line therewith. The connection 6 includes a relatively short stub shaft 8 which is journalled with respect to the end wall 9 of the casing by a ball bearing 10 and roller bearing 11. The driven connection 7 also takes the form of a relatively short shaft journalled with respect to the end wall 12 by a roller bearing 13. In the central portion of the machine, and between the shafts 7 and 8, is located the transmission shaft 14, which has its front end 15 of reduced size and journalled within a socket in the shaft 8 by means of a roller bearing 16. The rear end of the transmission shaft 14 is journalled with respect to the shaft 7 by a roller bearing 17.

Mounted on the inner end of the driving shaft 8 is a sprocket 18. Alongside of the transmission shaft 14 is a lay shaft 19, whose ends 20 and 21 are journalled in the heads of the casing by the roller bearings 22 and 23 respectively. This lay shaft carries at its forward end a sprocket 24 in line with the sprocket 18, the two sprockets being joined together by a silent chain 25. By this arrangement the lay shaft is constantly driven by the engine connection 6 and in the same direction as such connection.

As a matter of rigidity of construction I prefer to provide a central transverse web 26 in the casing located at approximately the central portion of the transmission and lay shafts, which shafts may be journalled with respect to the web 26 by roller bearings 27 and 28, as shown.

On the lay shaft 19 there are keyed two sprockets 29 and 30 of different sizes; and on the transmission shaft 14 in line with such sprockets there are journalled complementary sprockets 31 and 32 respectively.

This journalling may be effected in any convenient manner, as by means of roller bearings 33 and 34; silent chains 35 and 36 connecting the sprockets 29 and 31 and the sprockets 30 and 32 respectively. It will be observed that with this arrangement the sprockets 31 and 32 are constantly driven in the same direction as the engine connection 6, but at different speeds.

On the rear end of the lay shaft there are keyed two gears 37 and 38; and on the rear end of the transmission shaft 14 there is splined a gear 39. A short jack shaft 40 is located at one side of the transmission housing and carries a pinion 41 which meshes constantly with the lay shaft gear 37. The size and position of this pinion 41 are such that when the transmission shaft gear 39 is shifted backward to the first forward drive position it meshes with the pinion 41 but clears the gear 37. Upon shifting the gear 39 still further to the rear it passes through the pinion 41 and directly meshes with the lay shaft gear 38.

On the front end of the transmission shaft gear 39 there is formed a clutch element 42 which is normally free of a clutch element 43 on the face of the sprocket 32; but upon moving the gear 39 forwardly these two clutch elements are brought together so as to lock the sprocket 32 and the transmission shaft 14 together.

On the back face of the gear 39 is placed another clutch element 44, and a companion clutch element 45 is formed on the driven shaft 7, the arrangement being such that when the gear 39 is moved back far enough to mesh with the lay shaft gear 38 these two clutch elements are enmeshed so as to lock the gear 39 to the driven shaft 7.

On the front end of the transmission shaft 14 there is slidably keyed a collar 46 having on its rear end a clutch element 47 and on its front end a clutch element 48. Companion clutch elements 49 and 50 are formed in the sprockets 31 and 18 respectively, so that as the sleeve 46 is moved away from the neutral position illustrated in Fig. 1 it will lock the transmission shaft either to the sprocket 31 or to the sprocket 18, as dictated by the position of the sleeve.

A driving connection is provided between the transmission shaft 14 and the driven shaft 7, so that, during the forward rotation of the driving shaft for the delivery of power to the driven shaft, the two shafts are locked together, but in case of a tendency for the delivery of power backwards from the driven shaft 7 to the transmission shaft, said driven shaft can run ahead of the transmission shaft. This connection, which I will term a free wheel connection, is shown in detail in Fig. 4, and comprises a series of inwardly facing teeth 51 on the inner face of the flange which carries the clutch element 45, together with a series of dogs 52 on a plate 53 which is drivingly connected to the transmission shaft 14. The parts are so related that the dogs will engage the teeth for forward driving when power is delivered from the transmission shaft to the driven shaft 7, but the arrangement allows the driven shaft to run ahead of the transmission shaft when a tendency exists for an opposite transmission power. This free wheel connection is for the purpose of assisting the driver to move from higher to lower speed combinations without particular difficulty, and while I have illustrated the same in the present construction I wish to state that a device of this nature constitutes the particular subject matter of a co-pending application for Letters Patent of the United States, executed by me of even date herewith which has matured into Patent No. 1,528,452.

Suitable means may be provided for shifting the different clutch devices, particularly the gear 39 and the collar 46. The means illustrated takes the form of shifting bars 54 and 55 which extend lengthwise of the transmission casing, preferably one above the other. The bar 54 carries a fork 56 which engages the gear 39, and the bar 55 carries a fork 57 which engages the collar 46.

The sequence of movements is as follows: In Fig. 1 all of the driving connections are shown as being disengaged. The lay shaft 19 is, however, rotating at a speed dependent upon the engine speed. The first or low speed position consists in shifting the bar 54 rearwardly so as to mesh the gear 39 with the jack shaft pinion 41. This gives the maximum reduction of speed forward. The next movement consists in shifting the gear 39 together with its clutch element 42 forwardly a sufficient distance to engage said clutch element with the clutch element 43 of the sprocket 32. This gives an increased speed forward.

The next movement consists in returning the sprocket 39 to the central position shown in Fig. 1 and then moving the collar 46 rearwardly so as to engage its clutch 47 with the clutch 49 of the sprocket 31. This movement is accomplished by the use of a shifting bar 55 and gives an increased speed forward.

The final direct drive or high speed forward position is attained by shifting the collar 46 forwardly a sufficient distance to bring its clutch 48 into engagement with the clutch 50 of the sprocket 18, whereupon the transmission shaft is locked directly to the driving shaft 8.

As previously explained, the reverse drive is accomplished by moving the sprocket 39 rearwardly through the first forward drive position and far enough to engage the gear 39 with the pinion 38. Simultaneously the clutch elements 44 and 45 are brought together so that a proper driving connection will be established to the driven shaft 7 notwithstanding the presence of the free wheel attachment illustrated in Fig. 4.

While I have herein shown and described only a single embodiment of the features of my present invention, still I do not limit myself to the same except as I may do so in the claims.

I claim:

1. In a change speed device, the combination of driving and driven shafts in alignment with each other, having their adjacent ends separated, a transmission shaft between said adjacent ends and in alignment with said shafts, a lay shaft parallel to the transmission shaft, a chain drive connection between the driving shaft and the lay shaft to drive the lay shaft in the same direction as the driving shaft, a plurality of sprockets of different sizes journalled on the transmission shaft, companion sprockets drivingly mounted on the lay shaft, chain connections between the lay shaft sprockets and the companion transmission shaft sprockets for continuously driving the latter, a low speed forward drive pinion on the lay shaft adjacent to one of the sprockets thereon, an idler pinion meshing continuously with said lay shaft pinion, another pinion on the lay shaft of larger size than the first mentioned pinion and further removed from the adjacent lay shaft sprocket than the first mentioned pinion, a gear splined on the transmission shaft and of proper size to engage either the idler pinion or the larger lay shaft pinion selectively, a clutch on said gear adapted to engage the driven shaft when the gear engages the larger lay shaft pinion, a clutch on the gear adapted to at times engage the adjacent transmission shaft sprocket, a sleeve journalled on the front end of the transmission shaft, a clutch on such sleeve adapted to engage the adjacent transmission shaft sprocket when the sleeve is moved in one direction, and another clutch on such sleeve adapted to engage the driving shaft when the sleeve is moved in the other direction, substantially as described.

2. In a change speed device, the combination of a driving shaft, a transmission shaft in alignment therewith, a lay shaft parallel to the transmission shaft, a sprocket and chain connection between the driving shaft and the lay shaft for driving the lay shaft in the same direction as the driving shaft, a pair of sprockets of different sizes journalled on the transmission shaft, companion sprockets keyed to the lay shaft, chain drive connections between the lay shaft sprockets and the companion transmission shaft sprockets, a low speed forward drive pinion on the transmission shaft, a reversing pinion on the transmission shaft, further removed from the sprockets thereof than is the first mentioned pinion, an idler pinion meshing with the first mentioned pinion, a gear splined to the transmission shaft and of proper size to engage the idler pinion when moved into one position and of proper size to engage the second mentioned larger pinion on the transmission shaft when moved into proper position, a clutch device on said gear, adapted to engage the adjacent transmission shaft sprocket when moved into another position, a sleeve on the transmission shaft, a clutch thereon adapted to engage the adjacent transmission shaft sprocket when moved into one position, and another clutch thereon adapted to engage the driving shaft when moved into another position, substantially as described.

GEORGE J. RACKHAM.